(12) United States Patent
Kozuki

(10) Patent No.: US 7,965,920 B2
(45) Date of Patent: Jun. 21, 2011

(54) VIDEO AND AUDIO RECORDING DEVICE

(75) Inventor: Masahiro Kozuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1274 days.

(21) Appl. No.: 11/585,859

(22) Filed: Oct. 25, 2006

(65) Prior Publication Data

US 2007/0116436 A1    May 24, 2007

(30) Foreign Application Priority Data

Nov. 9, 2005 (JP) ................ P2005-324429

(51) Int. Cl.
  *H04N 5/765* (2006.01)
  *H04N 5/76* (2006.01)
(52) U.S. Cl. ........................ 386/234; 386/297
(58) Field of Classification Search .......... 386/1, 45–46, 386/52–53, 86, 95–96, 125–126
See application file for complete search history.

(56) References Cited

U.S. PATENT DOCUMENTS

| | | | | |
|---|---|---|---|---|
| 6,246,401 B1 * | 6/2001 | Setogawa et al. | | 715/723 |
| 7,587,122 B2 * | 9/2009 | Yoo et al. | | 386/52 |
| 7,764,868 B2 * | 7/2010 | Okada et al. | | 386/241 |
| 2006/0008239 A1 * | 1/2006 | Huang et al. | | 386/1 |
| 2006/0050088 A1 * | 3/2006 | Yahata et al. | | 345/638 |

FOREIGN PATENT DOCUMENTS

JP    2003-274298    9/2003

* cited by examiner

*Primary Examiner* — Thai Tran
*Assistant Examiner* — Nigar Chowdhury
(74) *Attorney, Agent, or Firm* — Morgan, Lewis & Bockius LLP

(57) ABSTRACT

A video and audio recording device includes: a storage, adapted to store condensed information; a specifier, operable to specify the condensed information stored in the storage; a registrar, operable to register the specified condensed information in a timer recording list as first timer recording information; and a recorder, operable to record a video and audio signal corresponding to the first timer recording information on a recording medium.

1 Claim, 9 Drawing Sheets

FIG. 7A

| LIST OF INFORMATION | RECORDING DATE | TIME TO START | | TIME TO END | CHANNEL | MODE |
|---|---|---|---|---|---|---|
| 1 | MONDAY | 21:00 PM | ~ | 23:00 PM | CH 6 | SP |
| 2 | SUNDAY | 20:00 PM | ~ | 21:00 PM | CH 8 | XP |
| 3 | TUESDAY | 21:00 PM | ~ | 23:00 PM | CH20 | XP |
| 4 | MONDAY TO FRIDAY | 13:30 PM | ~ | 14:00 PM | CH 8 | LP |
| 5 | DAILY | 7:00 AM | ~ | 7:30 AM | CH20 | SP |
| 6 | | | | | | |
| 7 | | | | | | |
| 8 | | | | | | |
| 9 | | | | | | |
| 10 | | | | | | |

211 CHANGE·ADD    212 CANCEL

FIG. 7B

| LIST OF INFORMATION | RECORDING DATE | TIME TO START | | TIME TO END | CHANNEL | MODE |
|---|---|---|---|---|---|---|
| 1 | MONDAY | 21:00 PM | ~ | 23:00 PM | CH 6 | SP |
| 2 | SUNDAY | 20:00 PM | ~ | 21:00 PM | CH 8 | XP |
| 3 | TUESDAY | 21:00 PM | ~ | 23:00 PM | CH20 | XP |
| 4 | MONDAY TO FRIDAY | 13:30 PM | ~ | 14:00 PM | CH 8 | LP |
| 5 | DAILY | 7:00 AM | ~ | 7:30 AM | CH20 | SP |
| 6 | | | | | | |
| 7 | | | | | | |
| 8 | | | | | | |
| 9 | | | | | | |
| 10 | | | | | | |

231 REGISTER    232 EDIT    233 CANCEL

FIG. 8A

| | RECORDING DATE | TIME TO START | | TIME TO END | CHANNEL | MODE | |
|---|---|---|---|---|---|---|---|
| | EDIT INFORMATION | | | | | | |
| 3 | TUESDAY | 21:00 PM | ~ | 23:00 PM | CH20 | XP | ← 202 |

251 REGISTER  252 CANCEL

FIG. 8B

| CHANGE-ADD | RECORDING DATE | TIME TO START | | TIME TO END | CHANNEL | MODE | |
|---|---|---|---|---|---|---|---|
| 1 | MONDAY | 21:00 PM | ~ | 23:00 PM | CH 6 | SP | |
| 2 | SUNDAY | 20:00 PM | ~ | 21:00 PM | CH 8 | XP | |
| 3 | TUESDAY | 21:00 PM | ~ | 23:00 PM | CH20 | XP | |
| 4 | MONDAY TO FRIDAY | 1:30 PM | ~ | 2:00 PM | CH 8 | LP | |
| 5 | DAILY | 7:00 AM | ~ | 7:30 AM | CH20 | SP | |
| 6 | DAILY | 6:00 AM | ~ | 6:30 AM | CH 2 | SP | ← 261 |
| 7 | | | | | | | |
| 8 | | | | | | | |
| 9 | | | | | | | |
| 10 | | | | | | | |

262

271 REGISTER  272 END  273 RETURN

FIG. 9A

| TIMER RECORDING | RECORDING DATE | TIME TO START | | TIME TO END | CHANNEL | MODE |
|---|---|---|---|---|---|---|
| 1 | 10 / 10 | 21 : 00 PM | ~ | 23 : 00 PM | CH 6 | SP |
| 2 | 10 / 13 | 20 : 00 PM | ~ | 21 : 00 PM | CH 8 | XP |
| 3 | THURSDAY | 21 : 00 PM | ~ | 23 : 00 PM | CH35 | SP ← 302 |
| 4 | MONDAY TO FRIDAY | 13 : 30 PM | ~ | 14 : 00 PM | CH 8 | LP |
| 5 | DAILY | 7 : 00 AM | ~ | 7 : 30 AM | CH20 | SP |
| 6 | 10 / 22 | 19 : 00 PM | ~ | 22 : 00 PM | CH 4 | SP |
| 7 | 10 / 29 | 20 : 00 PM | ~ | 21 : 00 PM | CH10 | XP |
| 8 | TUESDAY | 21 : 00 PM | ~ | 23 : 00 PM | CH20 | XP ← 301 |
| 9 | | | | | | |
| 10 | | | | | | |

311 FAVORITE REGISTER    312 END

FIG. 9B

| LIST OF INFORMATION | RECORDING DATE | TIME TO START | | TIME TO END | CHANNEL | MODE |
|---|---|---|---|---|---|---|
| 1 | MONDAY | 21 : 00 PM | ~ | 23 : 00 PM | CH 6 | SP |
| 2 | SUNDAY | 20 : 00 PM | ~ | 21 : 00 PM | CH 8 | XP |
| 3 | TUESDAY | 21 : 00 PM | ~ | 23 : 00 PM | CH20 | XP |
| 4 | MONDAY TO FRIDAY | 13 : 30 PM | ~ | 14 : 00 PM | CH 8 | LP |
| 5 | DAILY | 7 : 00 AM | ~ | 7 : 30 AM | CH20 | SP |
| 6 | THURSDAY | 21 : 00 PM | ~ | 23 : 00 PM | CH35 | SP ← 321 |
| 7 | | | | | | |
| 8 | | | | | | |
| 9 | | | | | | |
| 10 | | | | | | |

CHANGE·ADD    CANCEL

VIDEO AND AUDIO RECORDING DEVICE

BACKGROUND OF THE INVENTION

The present invention relates to a video and audio recording device that records a program corresponding to timer recording information registered in a timer recording list on a recording medium. More particularly, this invention relates to a video and audio recording device that registers condensed information specified from among input and stored condensed information in a timer recording list as timer recording information.

For example, when performing a timer recording in a DVD recorder, it takes an amount of time to input a recording date, a time to start recording, a time to end recording, a receiving channel, and a recording mode. Therefore, the following related art is disclosed. According to the related art, when a genre code of a program is inputted by using a remote controller, the input genre code is stored in a memory. And then, a genre code of a television broadcasting signal is extracted, and the extracted genre code is compared with the genre code stored in the memory. Therefore, the channel in which the extracted genre code matches with the stored genre code as result from the comparison is received. Further, even though the matched program in which the genre codes match with each other is not being broadcasted at present, if the matched program will be broadcasted within several hours or there are a plurality of the matched programs, a list of the programs is displayed according to the frequency of the previous reception. Therefore, when the list includes a program that a user wants to watch, the program that a user wants to watch is automatically timer-recorded by pressing a timer recording button (see JP-A-2003-274298).

However, the above related art has the following problems. That is, there are various genres of programs that the user wants to timer record, and not all the programs that the user wants to timer record are broadcasted within several hours from the present. Therefore, even when using the above related art, since programs that can be timer recorded are limited, it is very inconvenient to use.

SUMMARY

It is therefore an object of the invention to provide a video and audio recording device that is capable of reducing an amount of time to register timer recording information in a timer recording list.

It is also an object of the invention to provide a video and audio recording device that is capable of easily selecting which condensed information is preferably specified.

It is also an object of the invention to provide a video and audio recording device that is capable of simplifying operation for specifying condensed information.

It is also an object of the invention to provide a video and audio recording device that is capable of simply inputting condensed information.

It is also an object of the invention to provide a video and audio recording device that is capable of registering timer recording information that corresponds to a temporal change of broadcasting time or the like of a program while keeping condensed information corresponding to the program whose broadcasting time is not changed.

In order to achieve the object, according to the invention, there is provided a video and audio recording device comprising:

recording means for recording a video and audio signal obtained by receiving a television broadcast on a recording medium;

timer recording means for recording a program corresponding to timer recording information registered in a timer recording list on the recording medium by controlling the recording means;

information storing means for storing input condensed information;

information specifying means for specifying condensed information to be used as the timer recording information from among the condensed information stored in the information storing means;

information registering means for registering the condensed information specified by the information specifying means in the timer recording list as the timer recording information; and information condensing means for storing timer recording information specified from among timer recording information registered in the timer recording list in the information storing means as condensed information, wherein the information storing means stores the condensed information so as to correspond to a numerical button provided on a remote controller, the information specifying means displays a list of the condensed information stored in the information storing means when a shortcut button of the remote controller is pressed, and then enters a state that the condensed information can be specified, when any of the numerical button is pressed in the state that the condensed information can be specified, the information specifying means assumes that the condensed information that is stored in the information storing means so as to correspond to the pressed numerical button is specified, and the information specifying means accepts an edit for the specified condensed information and does not store edited contents as a storing content of the information storing means.

BRIEF DESCRIPTION OF THE DRAWINGS

FIGS. 7A and 7B are explanatory views showing a display screen when a list of condensed information is displayed.

FIGS. 8A and 8B are explanatory views showing a display screen when editing condensed information, and a display screen when changing, adding, and deleting condensed information.

FIGS. 9A and 9B are explanatory views showing a display screen when timer recording information registered in a timer recording list is stored in the information storing unit as condensed information.

DETAIL DESCRIPTION OF PREFERRED EMBODIMENTS

Hereinafter, embodiments of the invention will be described with reference to the accompanying drawings.

Figure 1:
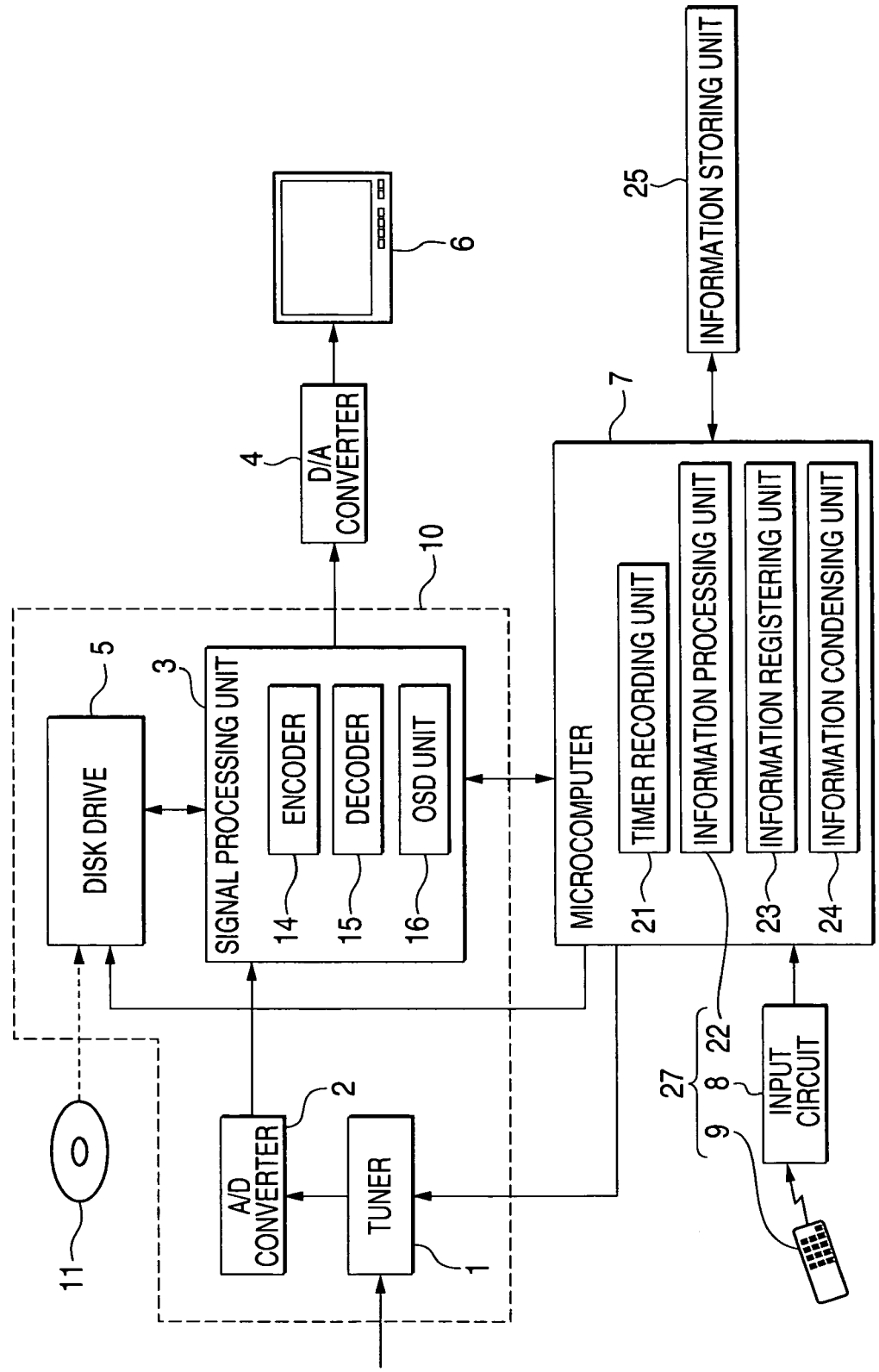
FIG. 1 is a block diagram showing an electrical configuration of a DVD recorder that is an example of a video and audio recording device according to an embodiment of the invention.

As shown in FIG. 1, this embodiment includes a recording unit 10, a D/A converter 4, a microcomputer 7, an input circuit 8, a remote controller 9, and an information storing unit 25.

Referring to FIG. 1, the recording unit 10 records a video and audio signal obtained by receiving a television broadcast on a DVD (recording medium) 11. Therefore, the recording unit 10 includes a tuner 1, an A/D converter 2, a signal processing unit 3, and a disk drive 5.

In particular, the tuner 1 receives a television broadcast corresponding to a channel indicated by the microcomputer 7 and outputs the received analogue video and audio signal (video and audio signal) to the A/D converter 2. The A/D converter 2 converts the analogue video and audio signal output from the tuner 1 into a digital video and audio signal and outputs the same to the signal processing unit 3.

The disk drive 5 records a digital signal (video and audio signal) that is obtained by performing an encoding or the like to the compressed video and audio information output from the signal processing unit 3, on the DVD 11 (for example, DVD-R, DVD-RW, DVD-RAM, etc.). Further, the disk drive 5 reads the digital signal recorded on the DVD 11 and demodulates the compressed video and audio information by performing demodulation and error correction or the like to the digital signal and then outputs the demodulated video and audio information to the signal processing unit 3.

The signal processing unit 3 compresses the digital video and audio signal output from the A/D converter 2 in accordance with an MPEG2 format (AC-3 regarding to audio information), by using an encoder 14. Thereafter, streaming is performed on the compressed video and audio information and then the video and audio information is output to the disk drive 5. By using a decoder 15, the compressed video and audio information output from the disk drive 5 is divided into streams of a video, an audio, and a subpicture and is then decompressed in accordance with the MPEG2 format (AC-3 regarding to audio information). Therefore, the decompressed digital video and audio signal is output to the D/A converter 4.

The signal processing unit 3 generates a signal representing characters or symbols indicated by the microcomputer 7 and overlaps the signal and the video signal, by using an on-screen display unit 16 (hereinafter, referred to as OSD).

The D/A converter 4 converts the digital video and audio signal output from the signal processing unit 3 into an analogue video and audio signal, and then outputs the converted signal to an external television receiver 6. The input circuit 8 includes a plurality of buttons such as a power button provided on a front panel of the device body (not shown) and a light-receiving unit for receiving an infrared signal transmitted from the remote controller 9. When a command is input from a user, the input circuit 8 outputs the input command to the microcomputer 7.

Figure 2:
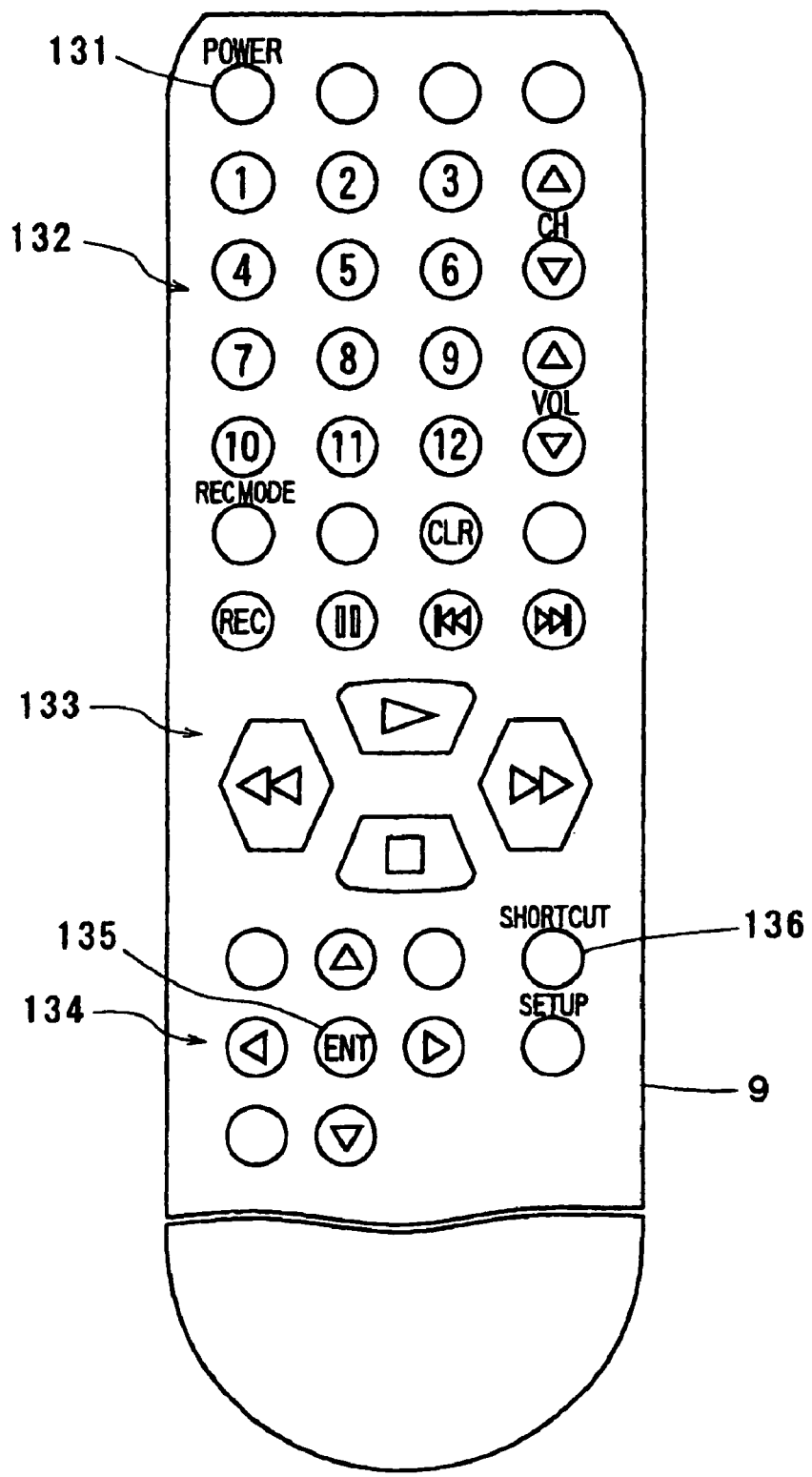
FIG. 2 is a view showing buttons provided on a manipulation face of a remote controller.

The buttons provided on the remote controller 9 will be described with reference to FIG. 2. On the manipulation face of the remote controller 9, the power button 131, numerical buttons 132 of numbers 1 to 12, four buttons 133 of play, stop, fast reverse, and fast forward, four directional buttons 134 of up, down, right, and left directions, an enter button 135, a shortcut button 136, and the other buttons are provided.

Referring to FIG. 1, the information storing unit 25 is configured by a nonvolatile memory such as EEPROM and stores input condensed information (which will be described in detail) so as to correspond to the numerical buttons 132.

The microcomputer 7 controls the operations of the DVD recorder. Specifically, the microcomputer 7 controls a channel which will be received by the tuner 1 on the basis of the user input via the remote controller 9. Further, by controlling the disk drive 5 and the signal processing unit 3, the program received by the tuner 1 is recorded on the DVD 11 as video and audio information. The video and audio information recorded on the DVD 11 is reproduced and displayed on the television receiver 6.

The microcomputer 7 controls reception of timer recording, and execution of timer recording. Therefore, in order to perform the above functions, the microcomputer 7 includes a timer recording unit 21, an information processing unit 22, an information registering unit 23, and an information condensing unit 24.

In detail, the timer recording unit 21 controls the recording unit 10 to record a program corresponding to timer recording information (see FIG. 9A) registered in a timer recording list on the DVD 11. The information processing unit 22 processes input condensed information or condensed information stored in the information storing unit 25. Therefore, an information specifying unit 27 is configured by the information processing unit 22, the remote controller 9, and the input circuit 8.

The information specifying unit 27 specifies condensed information to be used as timer recording information (to be described) from among the condensed information stored in the information storing unit 25. Therefore, when pressing the shortcut button 136, the condensed information stored in the information storing unit 25 is associated with numbers indicated on corresponding numerical buttons 132 and then the list is displayed on the television receiver 6 (refer to FIG. 7A). Thereafter, when one of numerical buttons 132 (one of number 1 button to number 10 button) is pressed in a state that the condensed information can be specified, it is assumed that the condensed information that is stored in the information storing unit 25 so as to correspond to the pressed numerical button is specified.

The information registering unit 23 registers the condensed information specified by the information specifying unit 27 in the timer recording list as timer recording information. The information condensing unit 24 stores timer recording information specified among timer recording information registered in the timer recording list in the information storing unit 25, as the condensed information.

Hereinafter, the condensed information and the timer recording information will be described. The condensed information refers to, for example, information shown in FIG. 7A, and can be used as the timer recording information (see FIG. 9A) for timer recording. In detail, the condensed information is based on the timer recording information, and has the same item as the timer recording information. Contents of the item are information having contents that are frequently used as the timer recording information. Further, the condensed information may be only one of the contents of the item, for example, the condensed information may be a time to start. In a case that this condensed information including only one content is specified, other contents for identifying the desired program are added to the timer recording list later. In a state that the condensed information is stored in the information storing unit 25, or the list of the condensed information is displayed (for example, see FIG. 7A), the condensed information corresponds to numbers 203, and the numbers 203 indicates the numerical buttons 132 provided on the remote controller 9.

Therefore, after specifying condensed information 202 displayed so as to correspond to the number '3' (denoted by reference numeral 201), when the specified condensed information 202 is directed to be registered in the timer recording list shown in FIG. 9A as timer recording information, it is possible to register the timer recording information indicating that the recording date is Tuesday, a time to start is twenty-one o'clock, a time to end is twenty-three o'clock, a receiving channel is channel 20, and a recording mode is an XP mode, in the timer recording list without inputting the recording date, the time to start, the time to end, the receiving channel, and the recording mode.

Figure 3:
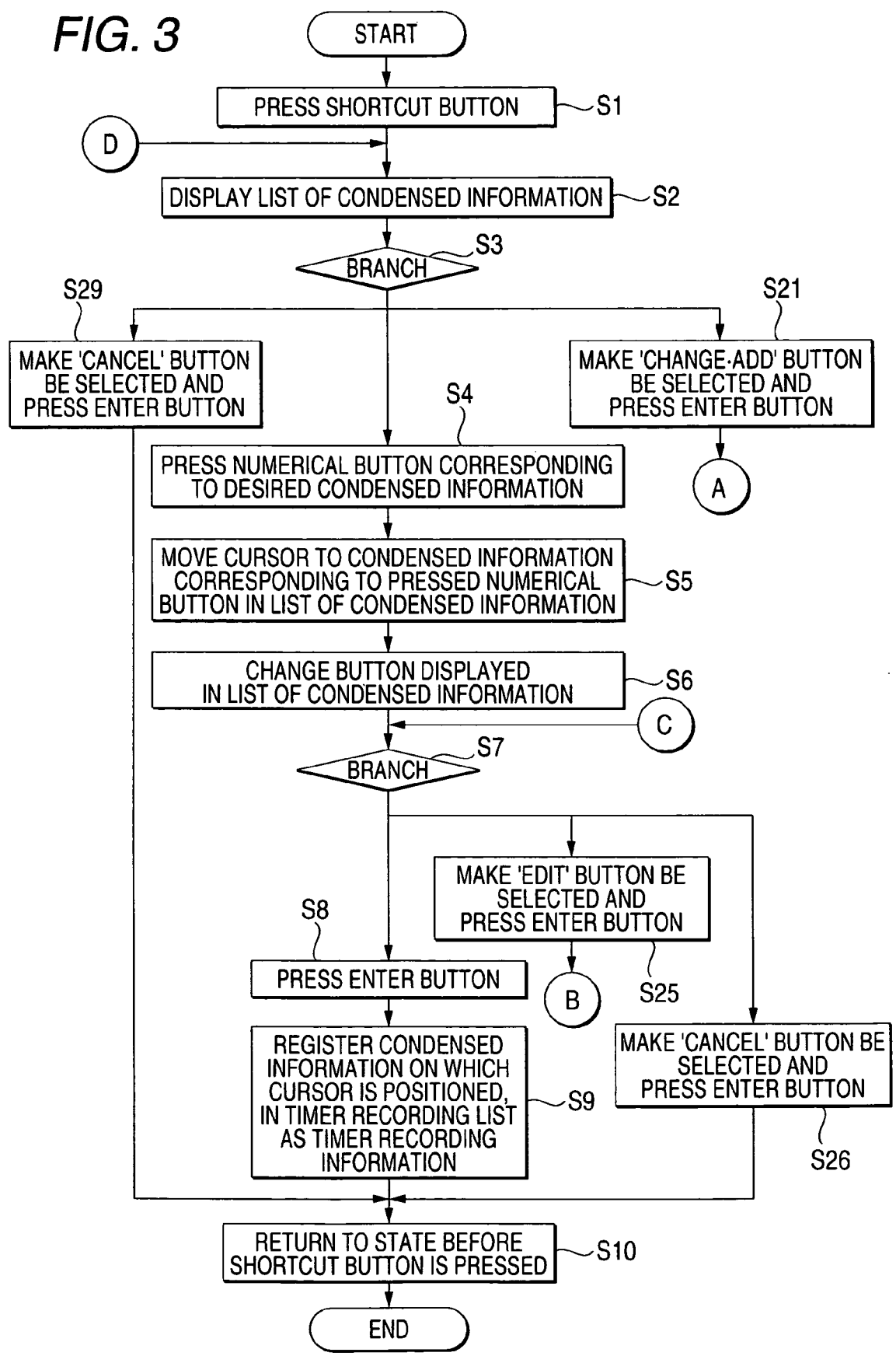
FIG. 3 is a flow chart showing an operation of an embodiment when condensed information is stored in a timer recording list as timer recording information.
Figure 4:
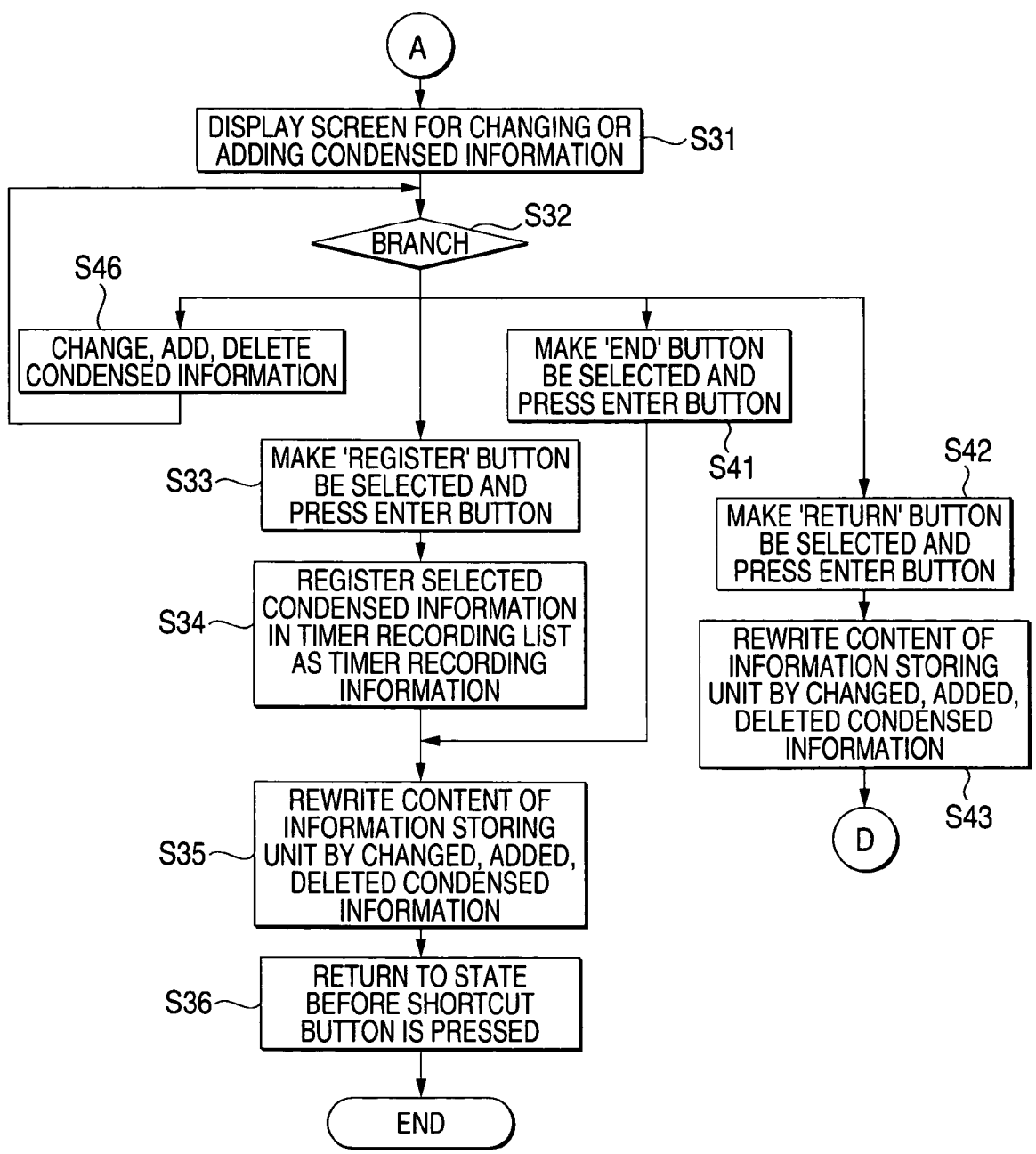
FIG. 4 is a flow chart showing an operation of an embodiment when condensed information is stored in a timer recording list as timer recording information.
Figure 5:
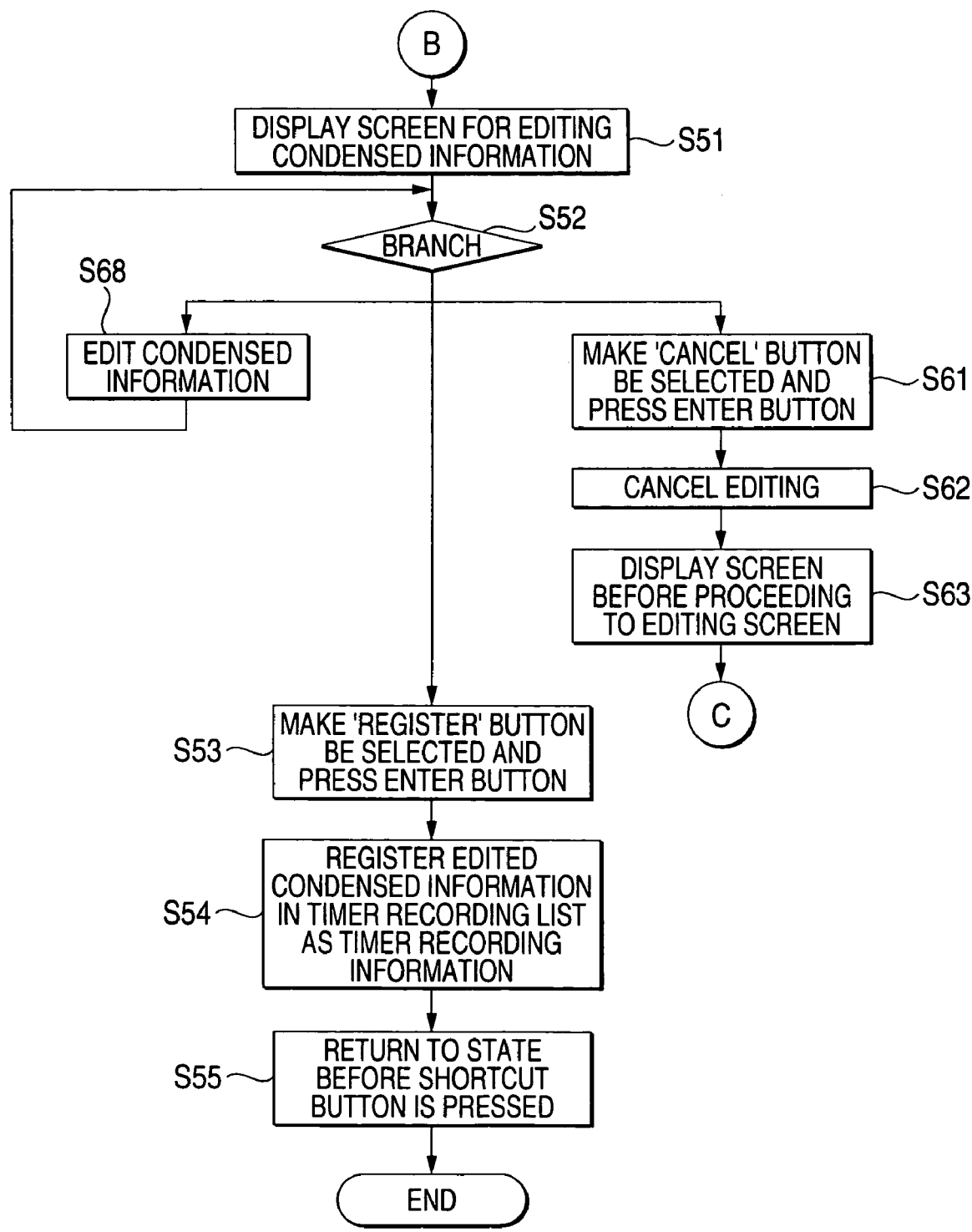
FIG. 5 is a flow chart showing an operation of an embodiment when condensed information is stored in a timer recording list as timer recording information.

If necessary, the operations of the embodiment will be described with reference to FIGS. 3 to 5. Five pieces of condensed information shown in FIG. 7A are previously stored in the information storing unit 25.

When pressing the shortcut button 136 provided on the remote controller 9, as shown in FIG. 7A, the information specifying unit 27 displays a list of the condensed information stored in the information storing unit 25 on the television receiver 6 (steps S1 and S2). The condensed information is displayed so as to correspond to the numbers 203, and the numbers 203 correspond to the numerical buttons 132 of the remote controller 9. That is, the condensed information corresponding to the number 1 corresponds to '1' button and the condensed information corresponding to the numbers 2 to 5 correspond to '2' to '5' buttons. Further, on the list, 'change•add' button 211 and 'cancel' button 212 are also displayed.

The user presses a numerical button 132 that corresponds to condensed information registered as the timer recording information in the timer recording list (steps S3 and S4). In this case, when the pressed numerical button 132 is '3' button, a cursor is positioned in the condensed information corresponding to '3' button as shown in FIG. 7B in displaying on the television receiver 6. It represents that the condensed information 202 corresponding to the number 3 is indicated (step S5).

Further, a 'change•add' button 211, and a 'cancel' button 212 that are displayed buttons are changed into a 'register' button 231, an 'edit' button 232, and a 'cancel' button 233. FIG. 7B shows that the 'register' button 231 among the three buttons 231 to 233 is selected (in FIG. 7B, the selected button is represented by using slant lines). In detail, according to the display shown in FIG. 7B, the condensed information 202 is specified, and the condensed information 202 is in a state that is capable of being immediately registered in the timer recording list as the timer recording information (step S6).

In this state, when pressing an enter button 135 of the remote controller 9 (steps S7 and S8), the information registering unit 23 registers the condensed information 202 on which the cursor 221 is positioned in the timer recording list as the timer recording information as if the selected 'register' button 231 is pressed. Reference numeral 301 in FIG. 9A indicates timer recording information that is registered in the timer recording list by the above operation (step S9). Thereafter, it returns to a state before the shortcut button 136 is pressed (step S10).

That is, as described above, by performing only three operations of pressing the shortcut button 136, pressing a numerical button 132 in order to specify desired condensed information, and pressing the enter button 135, it is possible to register timer recording information in the timer recording list.

Meanwhile, in the display state shown in FIG. 7B, by manipulating the four direction buttons 134, it is possible to cyclically change the button to be selected into the 'register' button 231, the 'edit' button 232, the 'cancel' button 233, and the 'register' button 231 (it is further possible to be changed in a reverse direction). Therefore, when the 'edit' button 232 is selected by using the four direction buttons 134, and then the enter button 135 is pressed, it proceeds to an edit mode that edits the contents of the specified condensed information 202 (steps S7 and S25). In this case, the display on the television receiver 6 is shown in FIG. 8A. That is, the specified condensed information 202 is displayed. Further, the 'register' button 251 and the 'cancel' button 252 are displayed (step S51).

In this displayed state, the condensed information 202 is edited as necessary (for example, a time to end of a final episode of a drama is edited from twenty-three o'clock to twenty-three thirty) (steps S52 and S68). After completing the necessary editing, the 'register' button 251 is selected by using the four direction buttons 134 and then the enter button 135 is pressed. Therefore, as if the 'register' button 251 is pressed, the condensed information that is completely edited is registered in the timer recording list as the timer recording information (steps S52 to S54). Thereafter, it returns to a state before the shortcut button 136 is pressed (step S55).

The above editing is available only for condensed information that is to be registered in the timer recording list as the timer recording information, and the condensed information stored in the information storing unit 25 (the condensed information that is indicated by reference numeral 202 in FIGS. 7A and 7B, and before editing) is not edited. That is, the editing in step S68 is available only for information to be registered in the timer recording list. Accordingly, even when condensed information 202 displayed on the screen for editing is edited, when the list of the condensed information is displayed by pressing the shortcut button 136 next time, the condensed information corresponding to the number 3 is condensed information that is not edited.

In a display state shown in FIG. 8A, when the condensed information 202 is edited (the condensed information may be not edited), the 'cancel' button 252 is selected by using the four direction buttons 134, and then the enter button 135 is pressed (steps S52, and S61), the editing is canceled (step S62). Therefore, it returns to a state before proceeding to the editing screen, that is, a display state of FIG. 7B (step S63).

In the state shown in FIG. 7B, when the 'cancel' button is selected by using the four direction buttons 134 and the enter button 135 is pressed (steps S7 and S26), it returns to a state before the shortcut button 136 is pressed without registering the timer recording information in the timer recording list (step S10).

In the meantime, in a display state after the shortcut button 136 is pressed, that is, a display state shown in FIG. 7A, when the 'change•add' button 211 is selected by using the four direction buttons 134, and the enter button 135 is pressed, the operation proceeds from steps S3 and S21 to step S31. Therefore, a screen for changing, adding, and deleting the condensed information (a screen shown in FIG. 8B) is displayed. A list of the condensed information stored in the information storing unit 25 that correspond to the numbers is displayed on the screen. Further, a 'register' button 271, an 'end' button 272, and a 'return' button 273 are displayed.

In this state, it is possible to change content of desired condensed information into desired content by using the buttons provided on the remote controller 9. Further, it is possible to add new condensed information (in this case, items of a recording date, a time to start, a time to end, a channel, and a recording mode are input). Furthermore, it is possible to delete unnecessary condensed information (steps S32 and S46). Reference numeral 261 denotes newly added condensed information (in this case, a cursor 262 is positioned in the condensed information 261, and the condensed information 261 is specified).

In the above state, when the 'register' button 271 is selected and the enter button 135 is pressed (steps S32 and S33), the specified condensed information 261 is registered in the timer recording list as timer recording information (step S34). Next, the stored contents of the information storing unit 25 are rewritten by changed, added or deleted condensed information (step S35). Thereafter, it returns to a state before pressing the shortcut button 136 (step S36).

In a state after changing, adding, or deleting the condensed information (step S46) (a state shown in FIG. 8B), when the 'end' button 272 is selected and the enter key 135 is pressed (steps S32 and S41), the stored contents of the information storing unit 25 is rewritten by changed, added or deleted condensed information (step S35). Thereafter, it returns to a state before pressing the shortcut button 136 (step S36).

In the state after changing, adding, or deleting the condensed information (step S46) (the state shown in FIG. 8B), when the 'return' button 273 is selected and the enter key 135 is pressed (steps S32 and S42), the stored contents of the information storing unit 25 is rewritten by changed, added or deleted condensed information (step S43). Thereafter, it proceeds to step S2. In this case, the condensed information stored in the information storing unit 25 is rewritten by changed, added or deleted condensed information. Accordingly, when the operation proceeds from step S43 to step S2, a list of the rewritten condensed information is displayed.

Figure 6:
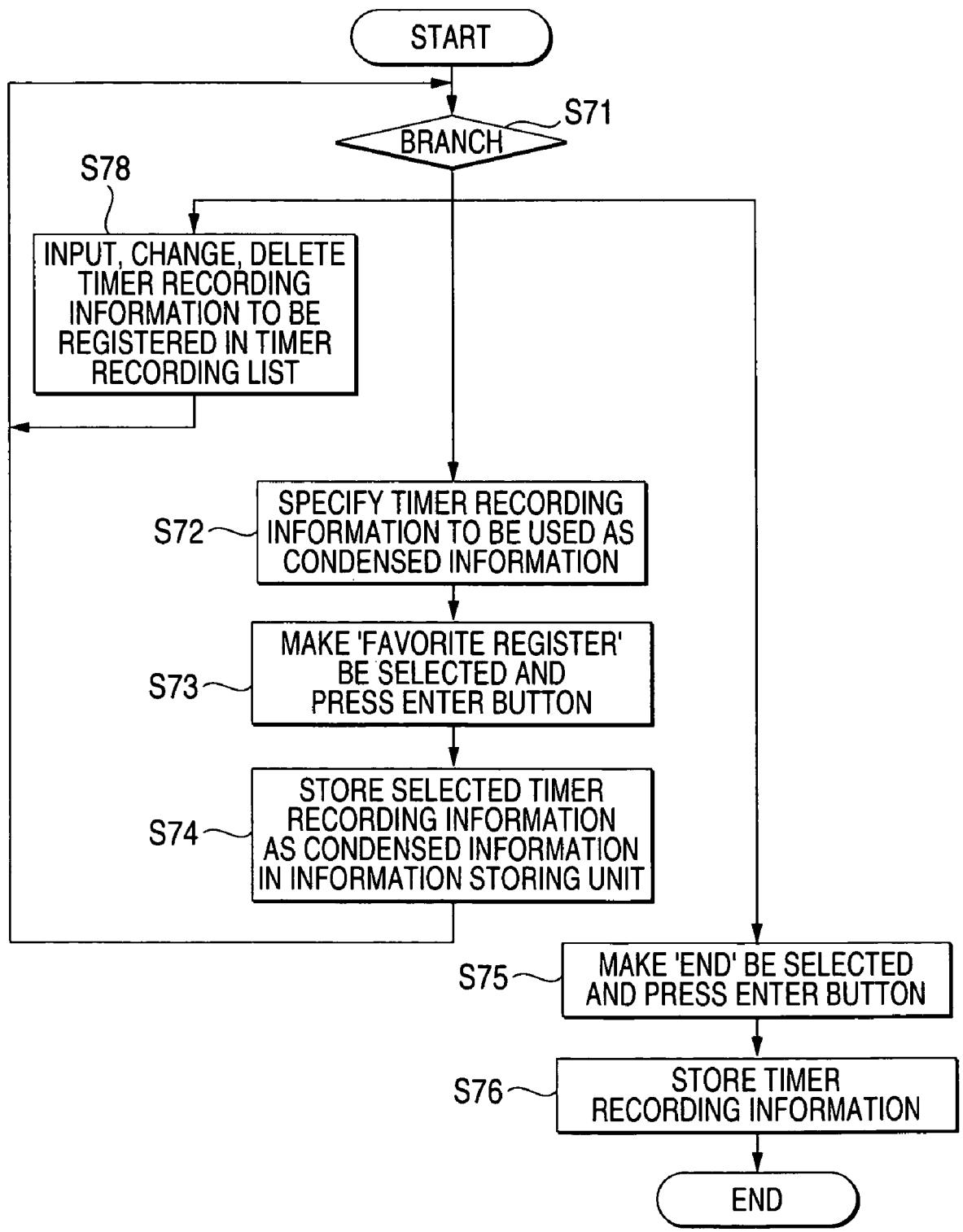
FIG. 6 is a flow chart showing an operation of an embodiment when timer recording information registered in a timer recording list is stored in an information storing unit as condensed information.

As described above, the description of the operation of registering the condensed information in the timer recording list as the timer recording information is completed, and the supplementary description will be performed with reference to FIG. 6, as necessary.

As described in the description of step S46, the condensed information to be stored in the information storing unit 25 is input by inputting the respective items of the condensed information. However, in this embodiment, the condensed information to be stored in the information storing unit 25 can be input by using the following method other than the above input method.

FIG. 9A shows a list of timer recording information registered in a timer recording list. There are two types of methods of registering the timer recording information in the timer recording list. One is the previously described method, that is, a method of selecting desired condensed information from among condensed information stored in the information storing unit 25 and registering the selected condensed information as the timer recording information. The other is the same method as the related art method, that is, a method of selecting a timer recording on a menu screen (not shown) and inputting the respective items in a state that the screen shown in FIG. 9A is displayed. Further, according to this method, it is possible to change or delete the input timer recording information (steps S71 and S78 in FIG. 6).

When inputting a timer recording, a 'favorite register' button 311 and an 'end' button 312 are displayed. Therefore, desired timer recording information from among timer recording information registered in the timer recording list (for example, timer recording information denoted by reference numeral 302) is specified (step S72). Further, when the 'favorite register' button 311 is selected and then the enter button 135 is pressed (step S73), the specified timer recording information is additionally stored in the information storing unit 25 as the condensed information (step S74).

Therefore, when inputting timer recording information for timer recording a new drama from the time when the new drama starts, it is possible to use the input information as the condensed information. Therefore, it is possible to significantly reduce the amount of time for inputting the condensed information.

FIG. 9B shows a list of the condensed information after the timer recording information of the timer recording list is additionally stored in the information storing unit 25 as the condensed information by the above-described method. In detail, the condensed information denoted by reference numeral 321 is added to the list displayed in FIG. 7A.

In a display state shown in FIG. 9A, when the 'end' button 312 is selected, and the enter button 135 is pressed (steps S71 and S75), the timer recording information registered in the timer recording list is stored in a storage area of the timer recording information, and the input of the timer recording information to the timer recording list is completed (step S76).

This invention is not limited to the above embodiment. Even though the DVD 11 is exemplified as a recording medium for recording the program, this invention can be applied to a device for recording a program on the other recording medium (for example, video tape, or hard disk drive, or other optical disks).

Further, in the display state shown in FIG. 7A, in order to specify condensed information, any of numerical buttons 132 corresponding to desired condensed information is pressed. However, the other method (for example, a method of specifying the desired condensed information by using a cursor) can be used.

In the present invention, the television broadcast includes internet television broadcast in which programs are provided through the internet.

Therefore, according to an aspect of the invention, after the condensed information is stored in the information storing unit, it is possible to register timer recording information in the timer recording list by input for specifying condensed information to be used as the timer recording information without inputting the timer recording information to respective items of the timer recording list. Further, since a list of condensed information that can be specified can be displayed, it is easy to determine which condensed information is preferably specified. Furthermore, it is possible to specify condensed information to be used as the timer recording information by simple manipulation of pressing numerical buttons. The condensed information can be inputted by specifying timer recording information registered in the timer recording list even when each item of the condensed information is not input. Condensed information having predetermined changed contents can be used as timer recording information without changing the condensed information stored in the information storing unit. Accordingly, it is possible to reduce an amount of time to register timer recording information in a timer recording list, easily select which condensed information is preferably specified, simplify input for specifying the condensed information, and simply input the condensed information. Further, according to the video and audio recording device, it is possible to register timer recording information that corresponds to a temporal change of the broadcasting time or the like of a program while keeping the condensed information corresponding to the program whose broadcasting time is not changed.

What is claimed is:

1. A video and audio recording device comprising:

recording means for recording a video and audio signal obtained by receiving a television broadcast on a recording medium;

timer recording means for recording a program corresponding to timer recording information registered in a timer recording list on the recording medium by controlling the recording means;

information storing means for storing input condensed information;

information specifying means for specifying condensed information to be used as the timer recording information from among the condensed information stored in the information storing means;

information registering means for registering the condensed information specified by the information specifying means in the timer recording list as the timer recording information; and information condensing means for storing timer recording information specified from among timer recording information registered in the timer recording list in the information storing means as condensed information, wherein the information storing means stores the condensed information so as to correspond to a numerical button provided on a remote controller, the information specifying means displays a list of the condensed information stored in the information storing means when a shortcut button of the remote controller is pressed, and then enters a state that the condensed information can be specified, when any of the numerical button is pressed in the state that the condensed information can be specified, the information specifying means assumes that the condensed information that is stored in the information storing means so as to correspond to the pressed numerical button is specified, and the information specifying means accepts an edit for the specified condensed information and does not store edited contents as a storing content of the information storing means.

* * * * *